United States Patent
Au

(10) Patent No.: US 6,473,397 B1
(45) Date of Patent: Oct. 29, 2002

(54) ADD/DROP MULTIPLEXER AND METHOD, AND BI-DIRECTIONAL LINE SWITCHER RING FEATURING SUCH MULTIPLEXERS

(75) Inventor: How-Kee Au, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/371,796

(22) Filed: Aug. 10, 1999

(51) Int. Cl.$^7$ ................................................ G06F 11/00
(52) U.S. Cl. ........................ 370/223; 370/218; 359/119; 359/128
(58) Field of Search ................................ 370/397, 217, 370/227, 396, 229, 230.1, 231, 221, 228, 244, 353, 359, 223, 222, 218; 359/128, 126, 119

(56) References Cited

U.S. PATENT DOCUMENTS

| | | | |
|---|---|---|---|
| 4,926,416 A | 5/1990 | Weik | 370/60.1 |
| 5,107,492 A | 4/1992 | Roux et al. | 340/85.6 |
| 5,168,492 A | 12/1992 | Beshai et al. | 370/60.1 |
| 5,377,182 A | 12/1994 | Monacos | 370/16 |
| 5,703,879 A | 12/1997 | Proctor et al. | 370/398 |
| 5,740,156 A | 4/1998 | Tanabe et al. | 370/60 |
| 5,742,606 A | 4/1998 | Iliadis et al. | 370/413 |
| 5,920,412 A * | 7/1999 | Chang | 359/128 |
| 6,256,292 B1 * | 7/2001 | Ellis et al. | 370/227 |
| 6,301,254 B1 * | 10/2001 | Chan et al. | 370/397 |

OTHER PUBLICATIONS

Tsong–Ho Wu, Senior Member, IEEE, Dennis T. Kong, and Richard C. Lau, Member, IEEE, "An Economic Feasibility Study of a Broadband Virtual Path SONET/ATM Self–Healing Ring Architecture", IEEE Journal on Selected Areas in Communications, vol. 10, No. 9, Dec. 1992, pp. 1459–1473.

Tsong–Ho Wu, "Cost–Effective Network Evolution: A three–phase path from todays SONET/STM ring transport to a SONET/ATM VP ring transport could facilitate the network evolution for broadband services", IEEE Communications Magazine, Sep. 1993, pp. 64–73.

\* cited by examiner

Primary Examiner—Ricky Ngo
Assistant Examiner—Phuc Tran
(74) Attorney, Agent, or Firm—Allan P. Millard

(57) ABSTRACT

An improved add/drop multiplexer in which groups of working channel tributaries have associated groups of protection channel tributaries is provided. Traffic is added by receiving it from an external service, and transmitting it on a configured group of working channel tributaries unless a protection event has occurred requiring it to be transmitted on the associated group of protection channel tributaries. Traffic received from protection or working channel tributaries is either dropped at the multiplexer if addressed to it, or transmitted on tributaries of the same type, be it working or protection. If working channel tributaries for use in the transmission relate to a physical link which is down, then the traffic is transmitted on the associated group of protection channel tributaries. In this way, all the working channel tributaries can be shared among users, rather than having a dedicated working channel tributary for each user.

23 Claims, 13 Drawing Sheets

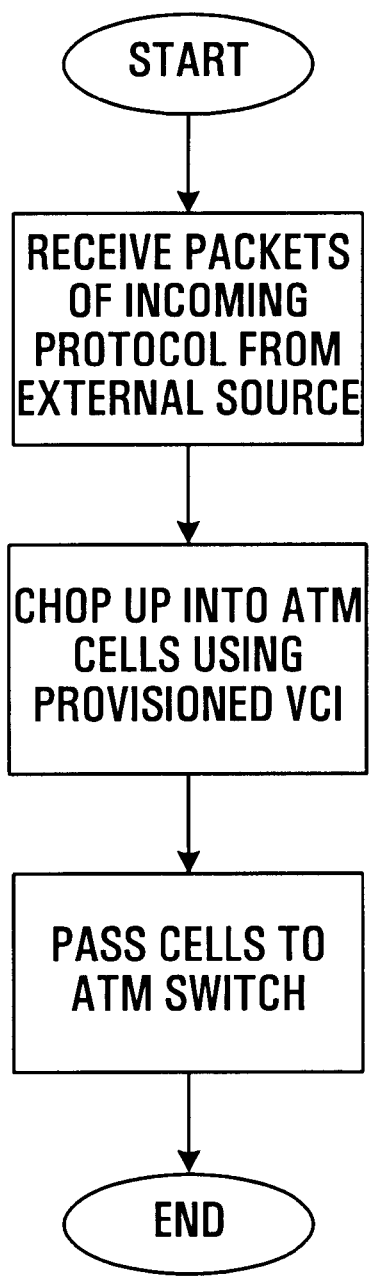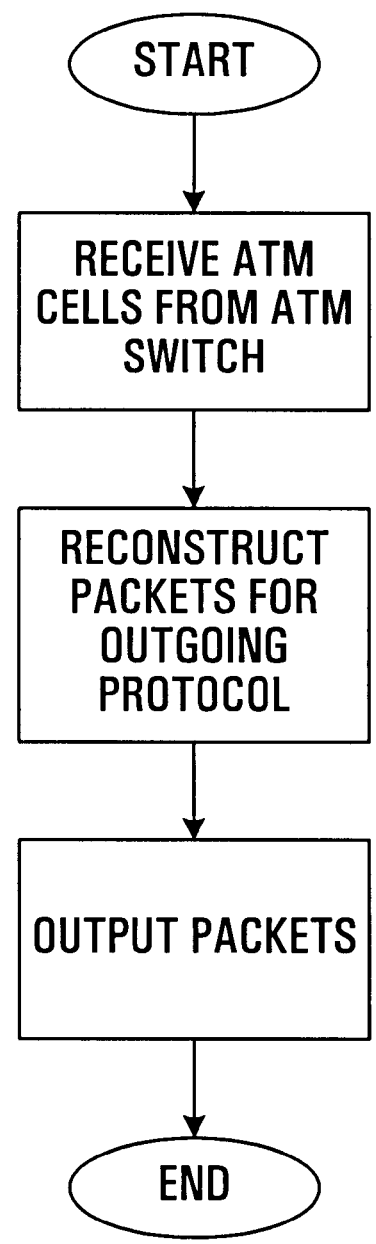
FIG. 4F
FIG. 4G

ADD/DROP MULTIPLEXER AND METHOD, AND BI-DIRECTIONAL LINE SWITCHER RING FEATURING SUCH MULTIPLEXERS

FIELD OF THE INVENTION

The invention relates to add/drop multiplexers, and more particularly to bi-directional line switched rings and their use of add/drop multiplexers.

BACKGROUND OF THE INVENTION

Bellcore published a paper in December 1992 entitled "An Economic Feasibility Study for a Broadband Virtual Path SONET/ATM Self-Healing Ring Architecture" in *IEEE Journal on Selected Areas in Communication* Vol 10 No.9 December 1992 on the economic feasibility of using ATM (asynchronous transfer mode) VP (virtual path) based technology to reduce the SONET ring cost of supporting the DS1 service, and a paper in September 1993 entitled "Cost-effective Network Evolution" *IEEE Communications Magazine September* 1993 on network evolution for broadband services based on the same principle. The two papers deal mainly on the economic viability of introducing ATM virtual path technology into the SONET (synchronous optical network) self-healing ring architecture. In general, in a typical SONET ring supporting add/drop multiplexers, the transport of data between any two nodes in the ring must follow some strict rules of configuration. For example, in a bi-directional line switched ring (BLSR), the key rules include that only half the number of tributaries of a fiber should be used for transport of data in any one direction. e.g. in an OC 48 BLSR, only 24 STS-1s (Synchronous Transport Signal, Level 1) are used in each fiber while the other 24 STS-1s are used for back-up in case of a fiber cut or node failure, and that data transport between any two nodes relies on a dedicated (or reserved) STS-1 or STS-3c (Synchronous Transport Signal, Level 3 concatenated) tributary between the nodes.

These rules result in the under-utilization of the potential bandwidth of the fiber, and introduce potential congestion in that each STS tributary can only support a single service. Furthermore, for the DS1 service, unless costly DS1 grooming is introduced at the DS1 level, there is a tremendous wastage of bandwidth.

In the above-identified papers, the Bellcore team describes the principle of transporting DS1 signals in the form of ATM cells within a STS-1 or STS-3c tributary terminating at two end nodes of a Fiber Ring network. Each pair of nodes in the fiber ring network is given a duplex VPI/VCI. Disadvantageously, cell processing is performed in each card and cell switching is also performed in each card, and a STS is reserved between nodes for each service subscribed following the existing BLSR procedure.

SUMMARY OF THE INVENTION

It is an object of the invention to obviate or mitigate one or more of the above identified disadvantages.

According to two broad aspects, the invention provides an add/drop multiplexer and multiplexing method. A plurality of STUs (service terminating units) are provided each having an associated identifier operable to receive information units from external services and to convert these into switching units containing a destination identifier, and to receive switching units having the associated identifier and combine them into information units and output them to the external services. A switching component is provided having a first set of dedicated receive ports operable to receive working channel traffic, a first set of dedicated transmit ports operable to transmit working channel traffic, a second set of dedicated receive ports operable to receive protection channel traffic, a second set of dedicated transmit ports operable to transmit transmit channel traffic, and an STU port for each STU operable to receive switching units from the respective STU and to send switching units to the respective STU. Switching units received by the switching component from the STUs are output through the first set of dedicated transmit ports unless a protection event has occurred affecting those ports in which case the switching units are output through the second set of dedicated transmit ports. The destination identifier of each switching unit received by the switching component from the first set of dedicated receive ports is examined by the switching component, and if the destination identifier is the same as the identifiers associated with one of the STUs, the switching unit is passed to the one of the STUs, and otherwise the switching unit is output through the first set of dedicated transmit ports unless a protection event has occurred effecting those ports in which case the switching unit is output through the second set of dedicated transmit ports.

Preferably, the first set of dedicated receive ports has a respective first subset of receive ports through which cells can be received from a first neighbour node, and a respective second subset of receive ports through which cells can be received from a second neighbour node. The second set of dedicated receive ports has a respective first subset of receive ports through which cells can be received from the first neighbour node, and a respective second subset of receive ports through which cells can be received from the second neighbour node. The first set of dedicated transmit ports has a respective first subset of transmit ports through which cells can be transmitted to the first neighbour node, and a respective second subset of transmit ports through which cells can be transmitted to the second neighbour node. The second set of dedicated transmit ports has a respective first subset of transmit ports through which cells can be transmitted to a first neighbour node, and a respective second subset of transmit ports through which cells can be transmitted to a second neighbour node.

Preferably, the multiplexer is connected to four fiber links, this consisting an incoming East-West fiber, an outgoing East-West fiber, an incoming West-East fiber and an outgoing West-East fiber. In this case, the ADM has a first fiber termination unit receive circuit connected to receive optical signals from the incoming West-East fiber, operable to convert these to electrical signals and to pass them to the first subset of the first set of dedicated receive ports and the first subset of the second set of dedicated receive ports. Furthermore, the ADM has a second fiber termination unit receive circuit connected to receive optical signals from the incoming East-West fiber, operable to convert these to electrical signals and to pass them to the second subset of the first set of dedicated receive ports and the second subset of the second set of dedicated receive ports. Furthermore, the ADM has a first fiber termination unit transmit circuit connected to receive electrical signals from the second subset of the first set of dedicated transmit ports and the second subset of the second set of dedicated transmit ports, operable to convert these to optical signals and to transmit them on the outgoing West-East fiber. Furthermore, the ADM has a second fiber termination unit transmit circuit connected to receive electrical signals from the first subset of the first set of dedicated transmit ports and the first subset of the second set of dedicated transmit ports, operable to convert these to optical signals and to transmit them on the outgoing East-West fiber.

Various techniques may be employed to select a particular port for a given switching unit. Preferably the next available port is selected.

A plurality of ADMs can be connected together by two fiber rings to form a bi-directional line switched ring.

Different traffic formats can preferably be handled such as DS3, IP, and Ethernet to name a few.

Preferably, the switching component is an ATM switch, the switching units are ATM cells, and the STU identifiers are ATM identifiers.

BRIEF DESCRIPTION OF THE DRAWINGS

Preferred embodiments of the invention will now be described with reference to the attached drawings in which:

FIGS. 4A to 4G are flowcharts of the functionality of the ATM-based ADM of FIG. 3;

DETAILED DESCRIPTION OF THE PREFERRED EMBODIMENTS

Figure 1:
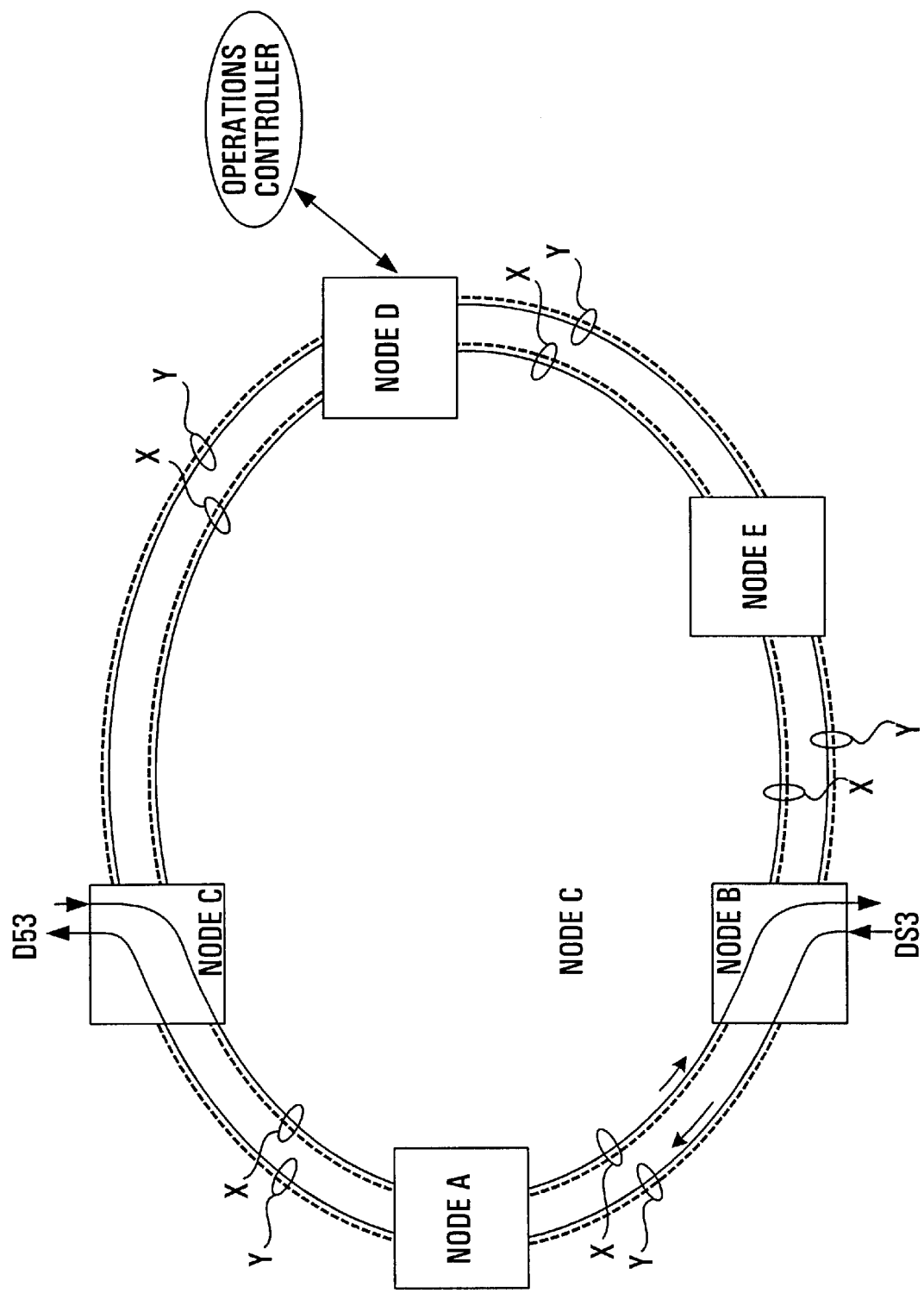
FIG. 1 is a schematic diagram of a conventional bi-directional line switched ring.

FIG. 1 shows an example of a conventional OC 48 BLSR (bi-directional line switched ring). Five nodes A, B, C, D, and E are STM (synchronous transfer mode) based ADMs (add-drop multiplexers) linked together by respective pairs of fibers X,Y (five shown). Each of the two fibers X,Y carries 48 STS-1s travelling in opposite directions with fiber X carrying traffic in a counter clockwise or East-West (E-W) direction and with fiber Y carrying traffic in a clockwise or West-East (W-E) direction. The fibers are shown with two lines, one solid indicative of the working channels, and one dashed indicative of the protection channels. The standards (BellCore GR1230-SONET BLSR Equipment Generic Criteria) have stipulated, among other requirements:

that each ring can support a maximum of 16 ADMs, though any number of regenerators may exist in the ring; and that 24 STS-1s within each OC 48 fiber are designated as working channels, and the other 24 STS-1s are used as protection channels.

Figure 2:
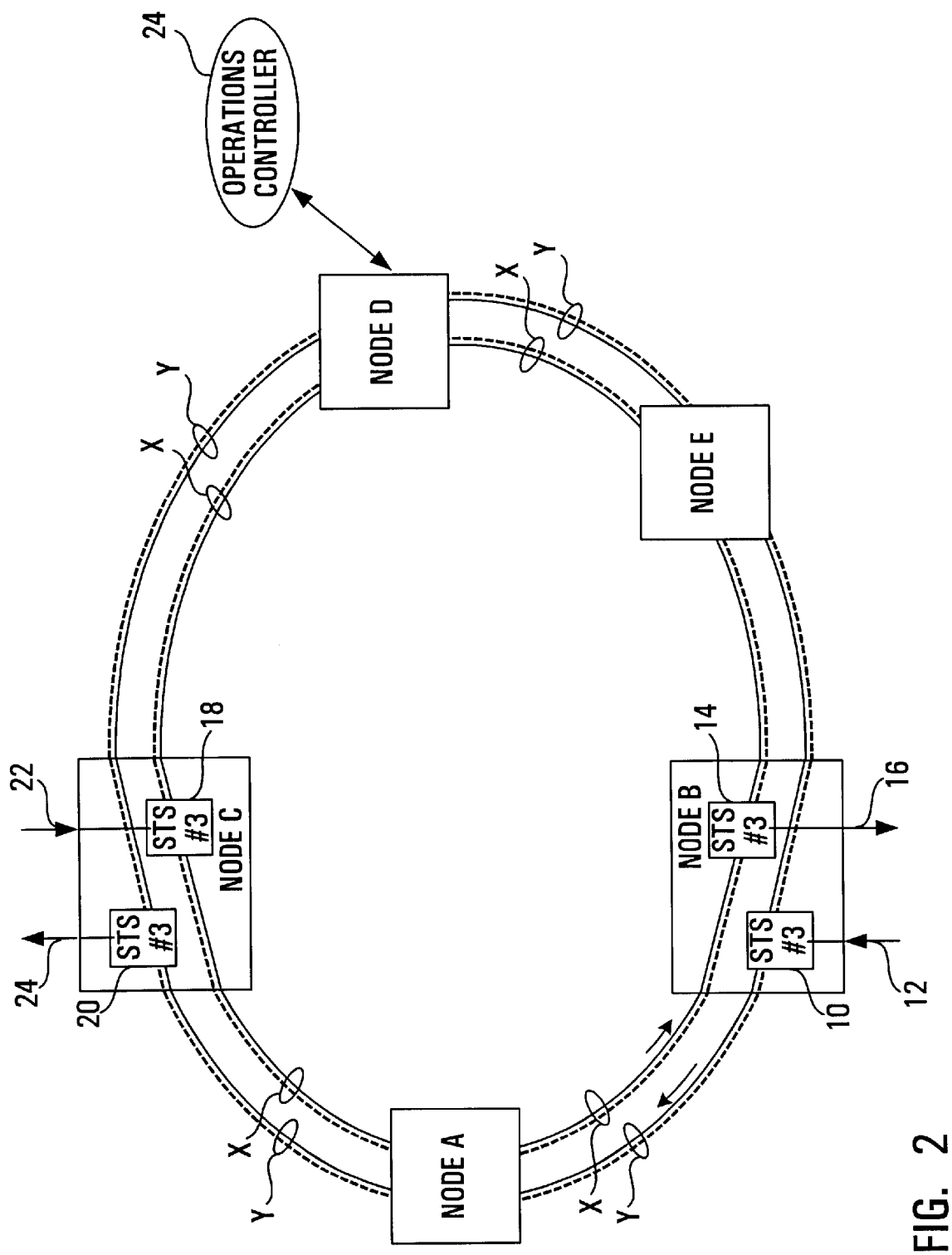
FIG. 2 is a schematic diagram of a DS3 connection established using the bi-directional line switched ring of FIG. 1.

If a DS3 circuit is provisioned for a service between nodes B and C, the DS3 signal from B to C is carried by a dedicated STS-1 (let us say, STS-1 #3) from B to A to C in fiber Y. The return traffic is carried by its counter part STS-1 #3 in fiber X which is dedicated from C to A to B. Further details of such a provisioning are illustrated in FIG. 2. The transport of the DS3 signals in the respective STS-1s is effected by switches in the ADMs. More particularly, node B has a switch 10 which receives data on an input line 12 destined for transport to node C. Switch 10 routes the data on input line 12 out over STS-1 #3 of fiber Y. Similarly, node B has a switch 14 for extracting data sent from node C over STS-1 #3 in fiber X, and routing this to an output line 16. Equivalent functions are performed by switches 18, 20 forming part of node C for input line 22 and output line 24 respectively. For this example, it is apparent that route B-A-C is the short route, while B-E-D-C is the long route. The selection of the route is under the jurisdiction of the telco facility administrator. For example, it may be provisioned via an operations controller 24. STS-1 #3 in both directions between B and C is occupied and reserved for the duration of the service subscribed. Each node A, B, C, D, E carries a map of the utilization of the channels. If a "fiber-cut" occurs between nodes A and B, the Automatic Protection Switching (APS) protocol described in BellCore GR 1230 will instigate nodes B and A to route the STS-1 #3 in both directions to the respective protection channels away from the fault. The default protection channel (according to the standards) for STS-1 #i in a first direction is STS-1 #(i+24) in the reverse direction, thus:

At node B, the traffic in STS-1 #3 in fiber Y is switched to STS-1 #27 in fiber X which is its default protection channel according to standards. This traffic now travels to node C via B-E-D-C;

At the same time, the traffic from C to B will be re-routed by node A, from STS-1 #3 in fiber X to STS-1 #27 in fiber Y which is its protection channel. This return traffic now travels to node B via C-A-C-D-E-B.

If node A fails instead of the above-exemplified fiber cut occurring, the APS protocol will protect the existing traffic in a similar manner.

The characteristics described for a conventional BLSR have the consequences that if the traffic between nodes B and C is so heavy as to occupy all 24 STS-1 working channels, it would be impossible for node A to communicate with any of the nodes in the ring. Furthermore, once a STS-1 has been provisioned for a given user, it is not available for use by other users even though it may not be carrying any traffic at all. These are inherent potential weaknesses of this type of transport network. The Bellcore proposals discussed previously replace the ADMs in the nodes of the ring with ATM-based ADMs, but do so in a manner which does not overcome all of the drawbacks of the existing conventional BLSR.

The 24 protection channels are a necessity to ensure the survivability of the ring. Indeed, telephone companies accept the concept of rings in their network to enhance network survivability. Telephone companies are aware of the wastage of channels and are in some cases currently using the protection channels for low priority traffic (known as "Extra Traffic") which will be lost when APS is activated by circuit failures.

The preferred embodiment of the invention provides an ATM-based ADM and a BLSR featuring such ATM-based ADMs which retain the concept of working and protection channels in a manner which provides increased flexibility and capacity. The new architecture will not affect a customers' previous concept of ring operation. As well, as the description below will make clear, the interlinking of the ATM switches enables the BLSR as a single entity to operate as an ATM switch which is distributed over hundreds of kilometers.

Figure 3:
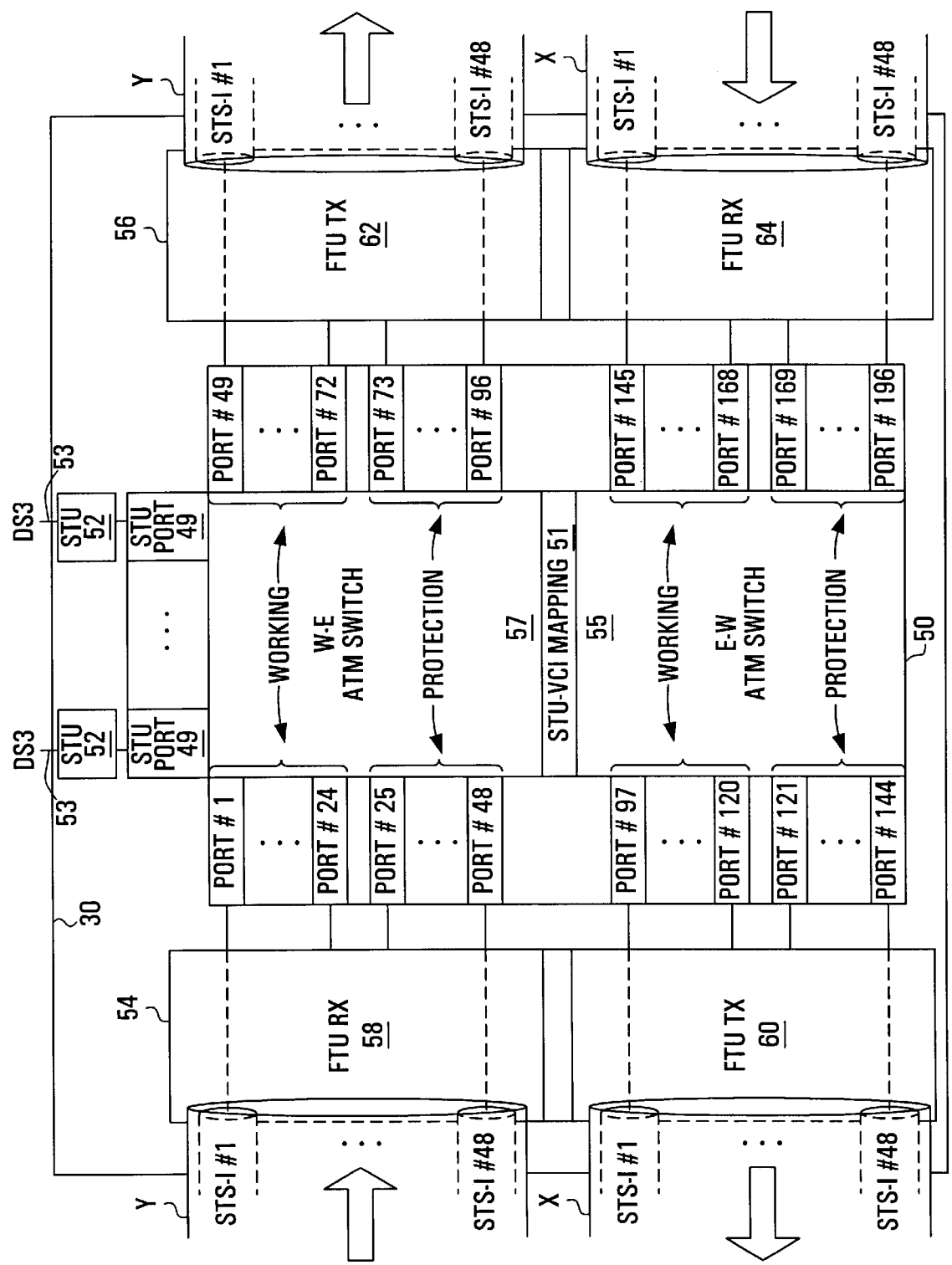
FIG. 3 is a block diagram of an ATM-based ADM according to an embodiment of the invention.

FIG. 3 illustrates the details of a single ATM-based ADM node according to an embodiment of the invention generally indicated at 30. To form a BLSR, a plurality of such ATM-based ADM nodes are connected together in a ring with two fibers X and Y running in opposite directions, as shown in an example system of FIG. 5.

For this example, it is assumed the node 30 supports DS3 services in an OC 48 transport system. Each node contains an ATM switch 50, a number of service terminating units (STU) 52 which support services incoming/outgoing to/from the node 30, and two fiber termination units (FTU) 54,56 to support terminations of fibers X and Y. While referred to as two fibers X and Y throughout this description, it is to be understood that each of these fibers is composed of a sequence of fibers which connect adjacent nodes in a ring.

Each STU 52 is a functional component such as a card that supports I/O ports for the external services, in this case a respective DS3 line 53, and I/O ports to a respective STU port 49 in the ATM switch 50. Each STU 52 is associated with a respective virtual channel identifier (VCI) which is used by the ATM switch 50 to switch cells as discussed in further detail below. More generally some sort of ATM identifier is assigned each STU 52. The STU 52 converts the DS3 signals incoming on the respective DS3 line 53 into ATM cells, to be switched. The STU 52 also reassembles the ATM cells terminating at the card from the switch 50, into a DS3 signal for output on the respective DS3 line 53. The ATM header is processed in the STU 52. An end-to-end connection within a BLSR composed of nodes such as node 30 is established between a first STU 52 of one node and a second STU 52 in another node. When such a connection is provisioned, each STU 52 knows the VCI of the destination STU 52 for the connection. It is the VCI of the destination STU which is inserted into the header of the ATM cells generated from the incoming DS3 signals.

The ATM switch 50 performs switching based on the VCI in the header of the cells. The ATM switch 50 in each node possesses a STU-VCI mapping 51 identifying the VCIs associated with all its STUs. The ATM switch has a full-duplex STU port 49 for each STU 52. Each STU-port 54 has receive port and transmit port functionality. The ATM switch 50 also has 196 ports labelled port#1 through port#196 which are connected to the FTUs 54,56. The details of these ports and these connections will be expanded upon further below. The ATM switch 50 reads the VCI of each cell it receives from any of its ports and will either terminate the cell in one of its STUs 52 if the VCI in the header of the cell matches the VCI associated with one of that node's STUs, as identified in the STU-VCI mapping 51 or will send it to one of the switch's output ports to be forwarded to a neighbouring node selected as described in detail below.

The FTUs 54,56 contain electro-optics circuitry for transmitting and receiving optical signals over the fibers X,Y and for performing protection re-routing as described in detail below. FTU 54 includes receive circuitry FTU Rx 58 which is connected to receive signals from fiber Y; FTU 54 further includes transmit circuitry FTU Tx 60 which is connected to transmit signals to fiber X. Similarly, FTU 56 includes FTU Tx 62 for transmitting to fiber Y and FTU Rx 64 for receiving from fiber X. The receive circuitries 58,64 convert their respective incoming optical signal to an electrical signal whereby 48 STS-1s are demultiplexed and are accessible. FTU 54 provides the electro-optical interface for bi-directional communication with a neighbour node located in a counter clockwise direction within the BLSR from the particular node 30, and FTU 56 provides the electro-optical interface for bi-directional communications with a neighbour node located in a clockwise direction from the particular node 30. Each STS-1 carries the ATM cells for or from the neighbouring nodes and terminates at a specific port of the ATM Switch. In the illustrated example, FTU Rx 58 converts STS-1#1 through STS1#48 incoming on fiber Y from the counter clockwise neighbour node to electrical signals containing ATM cells and passes these to port#1 through port#48 respectively of the ATM switch. FTU Tx 62 multiplexes 48 ATM cell streams received from port#49 through port#96 for the neighbouring node from the ATM switch 50 and converts the electrical signals to optical signals to be transmitted to the clockwise neighbour node over STS-1#1 through STU-1#48 respectively of fiber Y. Similarly, FTU Rx 64 converts optical information on STU-1#1 through STU-1#48 received on fiber X from the clockwise neighbour node into electrical signals, and passes the ATM cells this received to port#145 to port#196 of the ATM switch 50 respectively. FTU Tx 60 takes ATM cells received from port#97 to port#144 of the ATM switch 50, and converts those to optical signals on STS-1#1 through STS-1#48 outgoing on fiber X to the counter clockwise neighbour node. More generally, each tributary in the fibers of the ring is converted to ATM cells which are passed to a respective port of the ATM switch.

The ATM switch 50 in each node can be modelled as two smaller ATM switches one 55 of which is for transporting cells in the E-W direction on fiber X, while the other switch 57 is for the transport of cells in the W-E direction on fiber Y. This logically corresponds to the two STM based switches in the normal ADM. Similar to the previous ADM switch design, the STU ports 54 are connected to both small switches. However, only one of switches 55,57 is accessible by each of the receive and transmit port functionalities of a STU port 49 at any time and this is achieved by the provisioning of the ATM switch 50, for example by a crafts person via an operations controller (not shown). A transmit port has its traffic handled by one of the two ATM switches 55,57, thereby having its traffic sent on the fiber ring on a first direction, and the corresponding receive port has it traffic handled by the remaining one of the two switches 55,57, with its traffic sent on the fiber ring in the opposite direction.

For each interface between the ATM switch 50 and any one of FTU Rx 58, FTU Tx 60, FTU Tx 62, and FTU Rx 64, 24 ports and their corresponding STS-1s are designated as working channels, while the remaining 24 ports and their corresponding STS-1s are designated as protection channels. In the illustrated example, for fiber Y, STS-1#1 to STS-1#24 incoming to the W-E switch 57 through port#1 to port#24 and outgoing from the W-E switch through port#49 to port#72 are working channels, and STS-1#25 to STS-1#48 incoming to the W-E switch through port#25 to port#48 and outgoing from the W-E switch through port#73 to port#96 are protection channels. Similarly, for fiber X, STS-1#1 to STS-1#24 incoming to the E-W switch 55 through port#145 to port#168 and outgoing from the E-W switch 55 through port#97 to port#120 are working channels, and STS-1#25 to STS-1#48 incoming to the E-W switch through port#169 to port#196 and outgoing from the E-W switch 55 through port#121 to port#144 are protection channels. The working channels are used under normal conditions with the protection channels used in the event of a fiber cut or node failure.

Principles of Operation

Figure 4A:
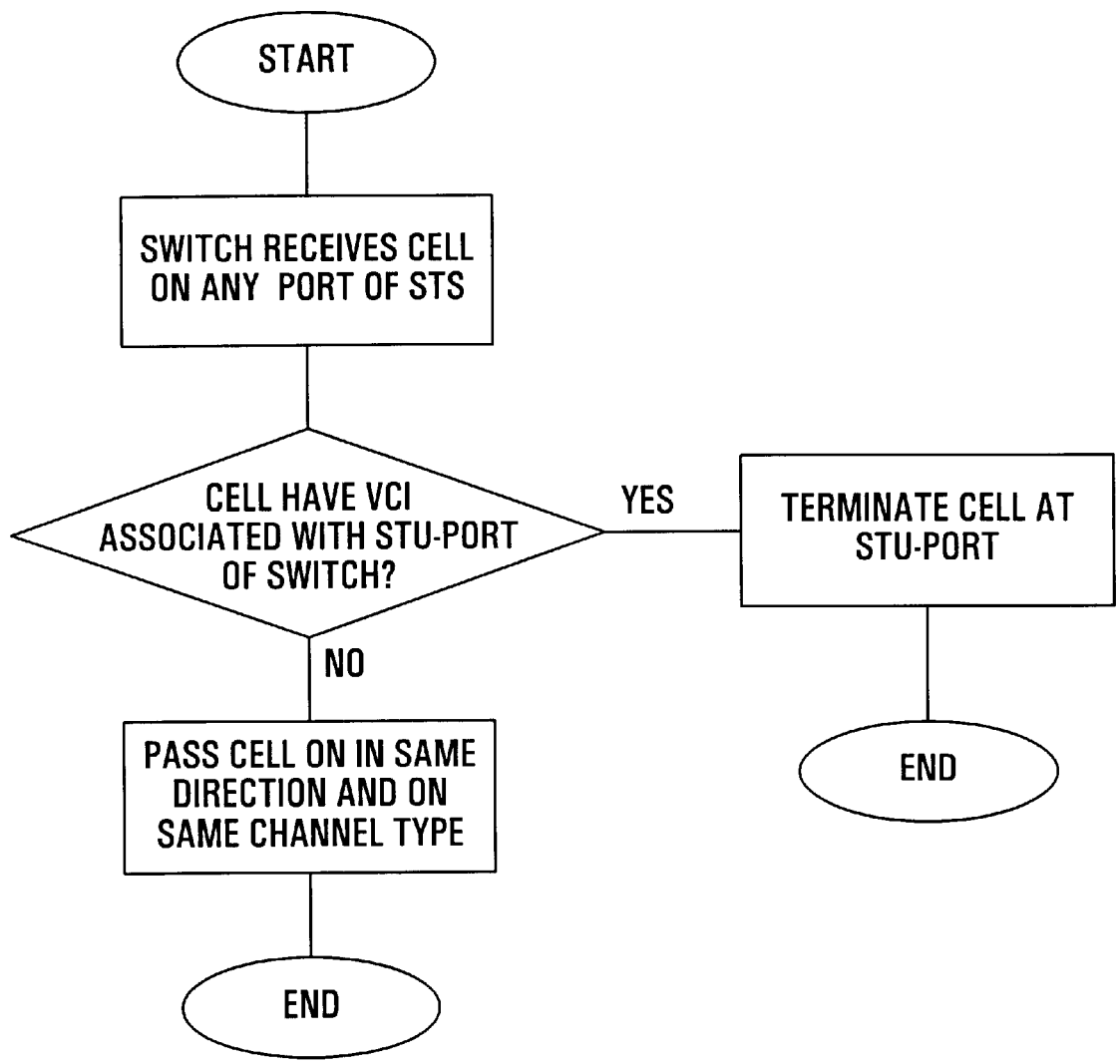

The functional operation of the ATM-based ADM of FIG. 3 will now be described in detail with reference to the flowcharts of FIGS. 4A through 4G. FIG. 4A is a flowchart for the operation of the ATM switch. To begin, it is assumed that the ATM switch receives a cell on any of its ports. If the cell has a VCI associated with one of that switches STU-ports, then the cell is terminated at the STU-port thus identified. Otherwise, the cell is simply passed on in the same direction and on the same channel type. This means that if the cell was received on a protection channel, it is sent on a protection channel, and if the cell is received on a working channel, the cell is sent out on a working channel. If the cell was received in on the Y fiber, it is sent out on the Y fiber, and similarly if the cell was received through the X fiber, it is sent out on the X fiber.

Figure 4B:
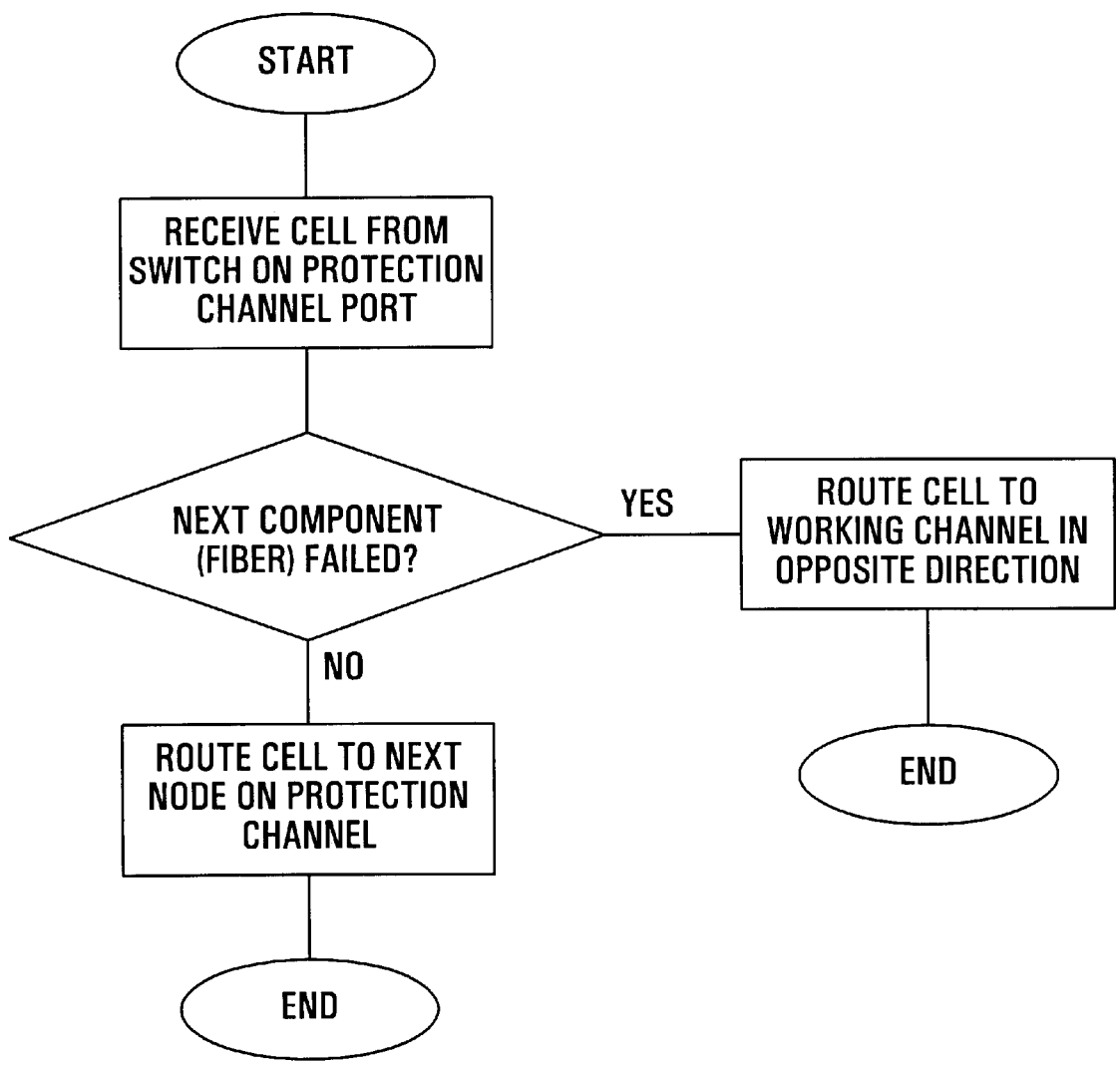
Figure 4C:
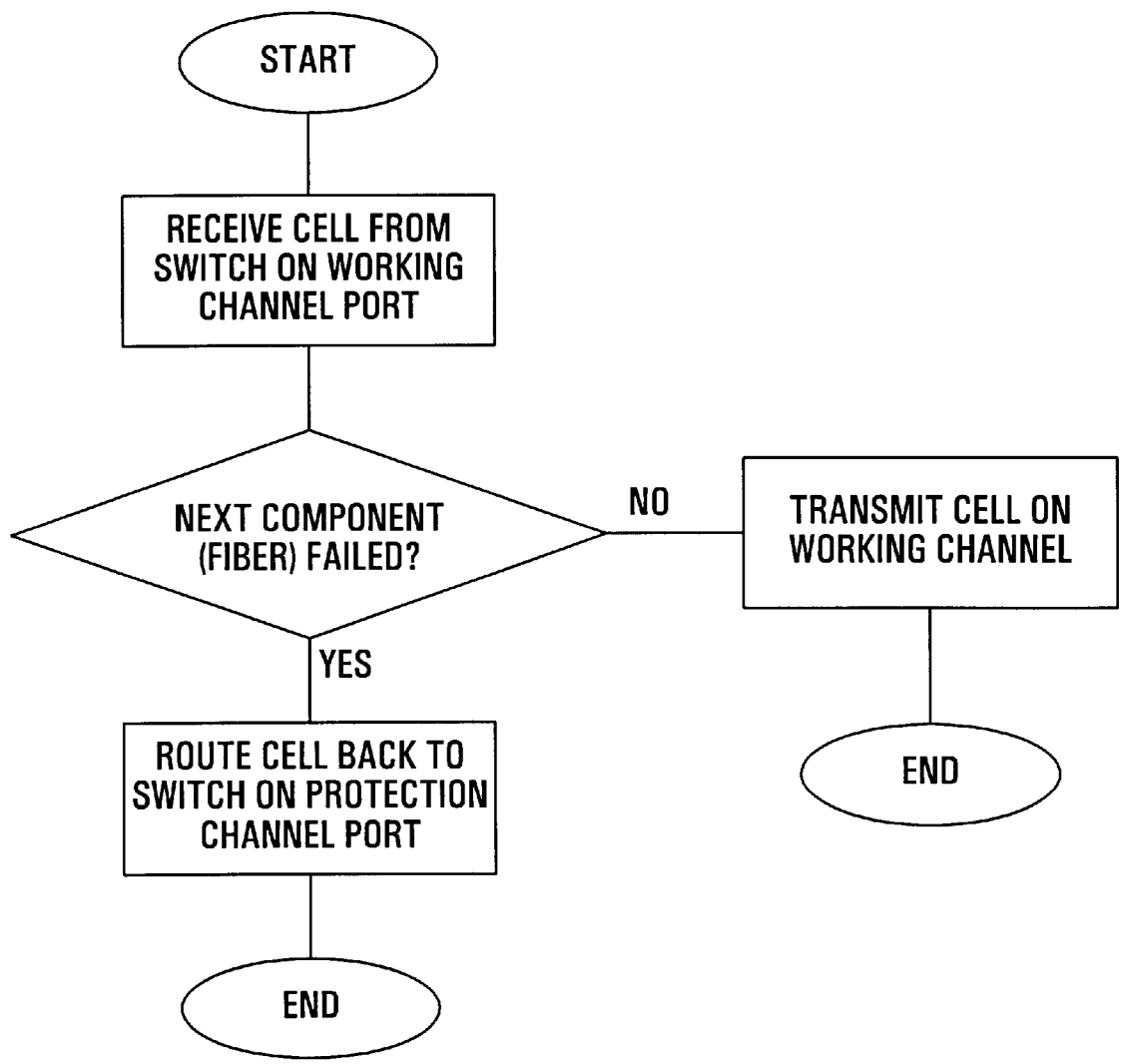

The functionality of the FTUs 54,56 will be described with reference to FIGS. 4B through 4E. Referring firstly to FIG. 4B, this deals with the functionality of an FTU when it receives a cell from the ATM switch from a protection channel port. If the next component, namely the fiber over which the cell is to be transmitted, is failed, then the cell is routed back to the switch in the opposite direction on a working channel port corresponding with the protection channel. Alternatively, if the fiber is not failed, then the cell is simply routed to the next node on the protection channel corresponding with the protection channel port over which it was received. Referring next to FIG. 4C, this deals with what happens when the FTU receives a cell from the switch through a working channel port. If the next component, in this case the outgoing fiber, is failed, then the cell is routed back to the switch on the protection channel port corresponding with the working channel port through which the cell was originally received. If the fiber does not have a failure indicated, then the cell is simply transmitted on the working channel of the fiber.

Figure 4D:
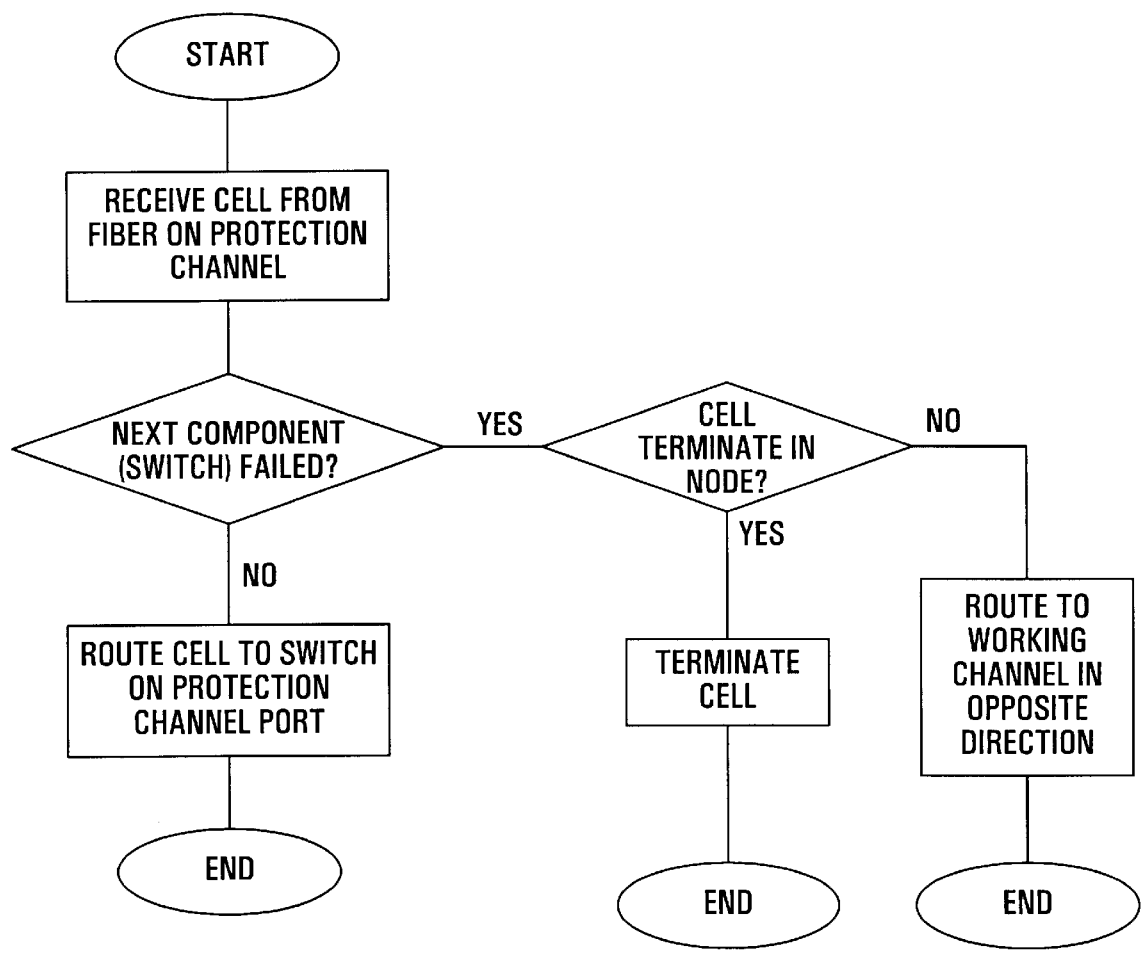

FIG. 4D deals with the behaviour of the FTU when it receives a cell from a fiber on a protection channel. Firstly, if the next component, in this case the switch forming part of the same node, has failed, and the cell is to terminate in that node, then the cell is terminateed. If the switch has failed but the cell is not to terminate in that node, the FTU reroutes the cell on the protection channel's corresponding working channel in the opposite direction. Alternatively, if the switch has not failed then the cell is routed to the switch to the protection channel port corresponding with the protection channel over which the cell was received.

Figure 4E:
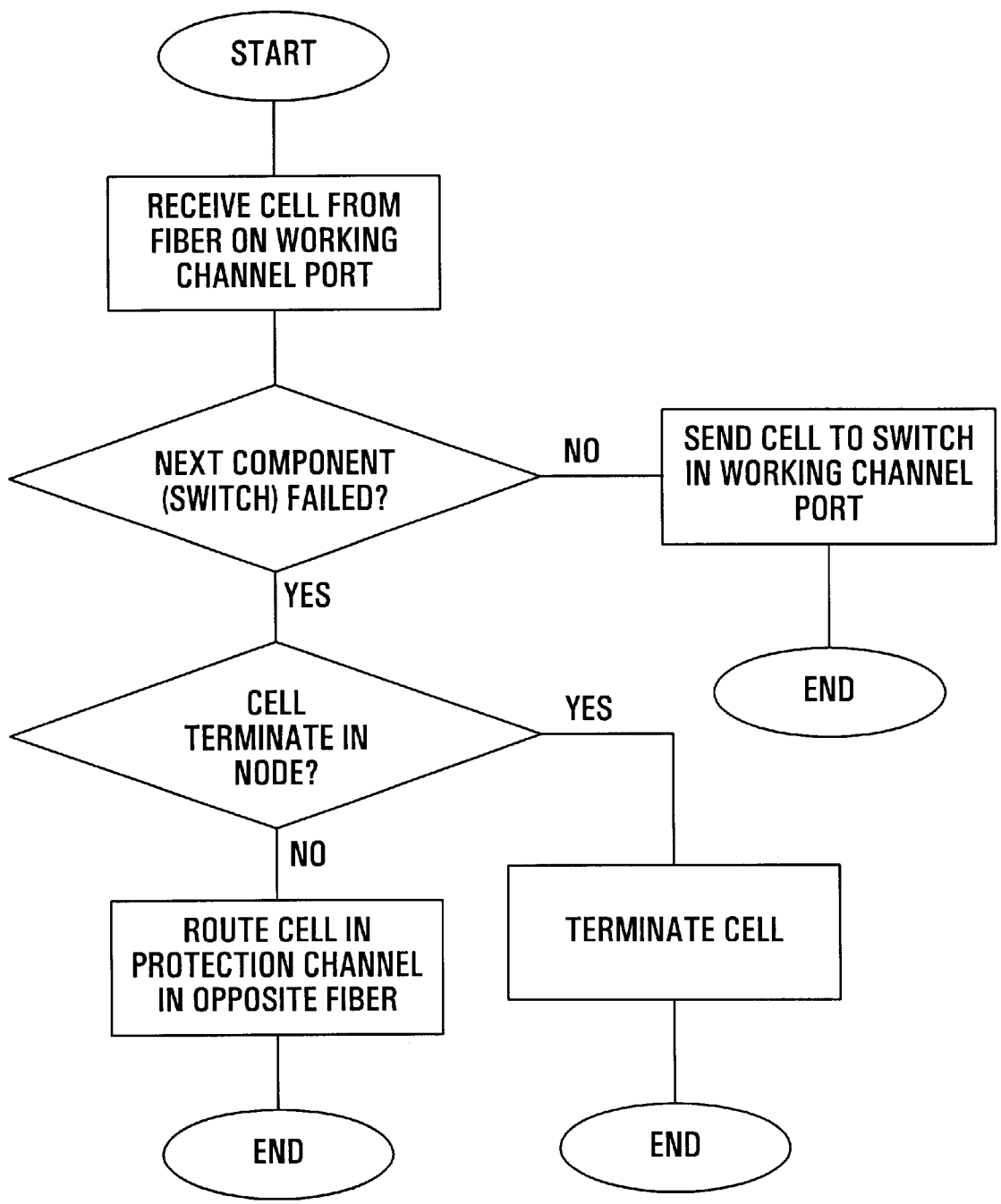

In FIG. 4E the behaviour of an FTU when it receives a cell from a fiber on a working channel is shown. If the next component, namely the switch forming part of the same node has failed, and the cell is to terminate in that node, then the cell is terminateed. If the node has failed but the cell is not to terminate in that node, the FTU reroutes the cell back on the opposite fiber on the working channel's corresponding protection channel. If the next component is not failed, then the cell is passed to the switch in the working channel port corresponding with the working channel.

FIG. 4F is a flowchart for what is done by an STU 52 when it receives a packet from external to the ATM-based BLSR in an incoming protocol. This incoming protocol is DS3 in the above described example, but it could be other protocols as exemplified further below. Firstly, a packet is received by the STU 52 from the external source. Next, the STU 52 chops up the received packet into ATM cells using the provisioned VCI for that STU 52. Finally, the cells are passed to the ATM switch 50 for switching. The provisioned VCI will determine where these cells get sent.

FIG. 4G is the processing performed by a STU 52 when it receives ATM cells from the ATM switch 50. Firstly, it receives an ATM cell from the ATM switch 50. Next, the STU 52 reconstructs packets for the outgoing protocol. This might be DS3 as in the above discussed example. Finally, the newly reconstructed packets are output on the outgoing line.

Figure 5:
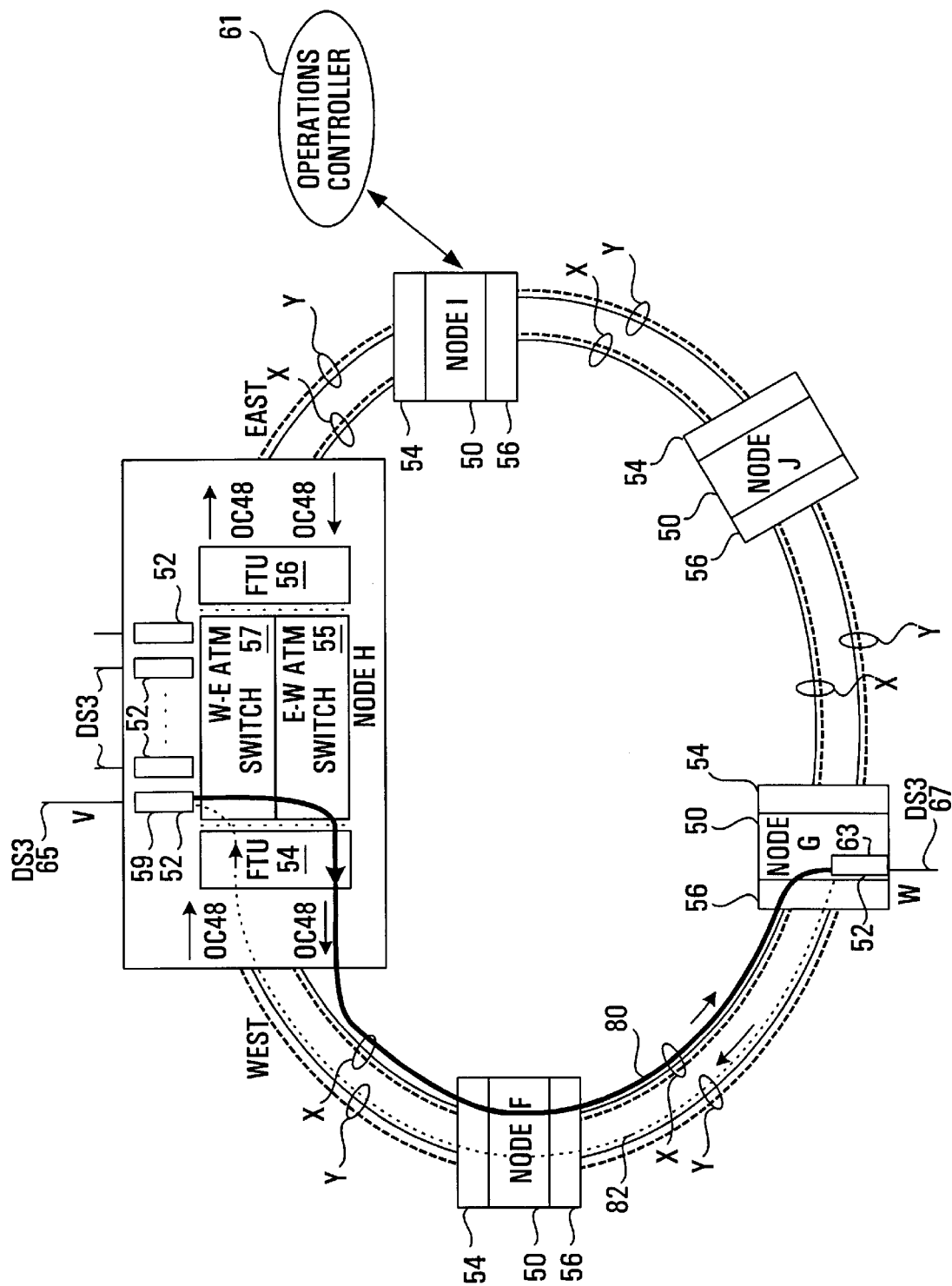
FIG. 5 is a schematic diagram of a bi-directional line switched ring using the ATM-based ADM of FIG. 3.

An operational example will now be described with reference to FIG. 5 which illustrates a BLSR according to an embodiment of the invention in which each of nodes F, G, H, I, J are ATM-based ADMs as detailed in FIG. 3, the summary details of one of the nodes, node H, being shown and the switch 50 and FTUs 54,56 being shown for all nodes. As in FIG. 3, each of nodes F, G, H, I, J have a respective plurality of STUs 52. In the illustrated example, two particular STUs are identified at 59,63, one of these 59 being an STU 52 in node H, and another of these 63 being an STU 52 in node G. STUs 59,63 are shown connected to particular DS3 lines 65,67 respectively.

At system initialization, as in the normal BLSR environment, each of the nodes in the system is aware of all its neighbours in the ring. An operations controller (OC) 61 has the knowledge of all the STUs 52 in each of nodes F, G, H, I, J and each STU is assigned a respective identifier, by configuration. This is the associated VCI of the STU. Each STU 52 supports an input and an output service port (DS3 in this example) external to the node and the corresponding I/O ATM ports connected to the ATM switch 50 in the node.

Suppose that a service requester needs a connection between STU 59 of node H having VCI-V and STU 63 of node G having VCI-W. Let us assume that the craftsperson has selected the short route i.e. H-F-G. The craftsperson will provision thus:

instruct node H that the originating card is STU 59, the destination node is G, and the destination card ID is VCI-W, and that the route is H-F-G; and instruct node G that the originating card is STU 63, the destination node is H, and the destination card ID is VCU-V, and that the route is G-F-H.

In node H, the STU 59 will convert the DS3 signal received on line 65 into ATM cells each of which will have VCI-W in its header identifying STU 63 as the destination card for the cells. Because the route is H-F-G, the E-W switch 55 in node H is selected for transmission. The W-E switch 57 in node H will be used for the return path. Cells will thus be transmitted out on fiber X (through FTU Tx 60 not shown) using the ATM switch ports#97 to port#120. Traffic sent by node H will be received over fiber X by node G at the ATM switch ports#145 to port#168 (through FTU Rx 64 not shown).

Similarly, in node G, STU 63 will insert VCI-V in its ATM cells thereby identifying STU 59 as the destination card for the cells. Because the route is G-F-H, the W-E switch 57 in node G is selected for transmission. The E-W switch 55 in node G will be used for the return path. Cells will thus be transmitted out on fiber Y (through FTU Tx 62 not shown) using ATM switch port#49 to port#72. Traffic sent by node G will be received over fiber Y by node H at the ATM switch port#1 to port#24 (through FTU Rx 58 not shown).

Each cell received by an ATM switch 50 is switched according to its VCI. This consists of either terminating the cell on an STU 52 connected to the ATM switch 50 if the VCI identifies such an STU, or passing the cell out the other side of the switch on the continuation of same fiber it was received on, and on the same channel type, be this protection or working.

By way of example, the path of an ATM cell from node H to node G will be described. This path being depicted by a solid thick line 80 drawn adjacent the solid line for fiber X to indicate working channels are used. The E-W switch 55 in node H reads the header of the cell and notes that the destination is not in same node H. It will select an output port associated with in the H-F-G direction. This could be any one of port#97 to port#120. A specific port for the cell is not pre-selected. The E-W ATM switch has the flexibility to choose any one of the working channel ports. The E-W ATM switch 55 may for example select the first port with a minimum or zero queue length and drop the cell.

At node F, the E-W switch 55 in that node determines that the destination of the cell is not in node F, and it will select an output working channel port associated with its FTUTx 60 in the F-G direction, and drop the cell.

At node G, the E-W switch 55 realizes that VCI-W belongs to one of its STUs 52. It will thus drop the cell in the port of the STU 63.

The cells from STU 63 in node G to STU 59 in node H follow the same process in the opposite direction with the path being depicted by a dashed line 82 drawn adjacent the solid line for fiber Y to indicate that working channels are used.

It can be seen from the discussion that in each node all the 24 working STS-1s are shared by the traffic between nodes. None of the STS-1s are dedicated. Selection of inter-node STS-1s is dynamically done. Congestion is possible if all the STS-1s carry Constant Bit Rate traffic at all times in both directions of ring propagation. The craftsperson can monitor the congestion status of each STS-1 in the FTUs of each node before provisioning for additional traffic, in the long or short route.

The traffic transport efficiency of this ring is better than the existing STM BLSR as all the available working channels are being shared.

Figure 6:
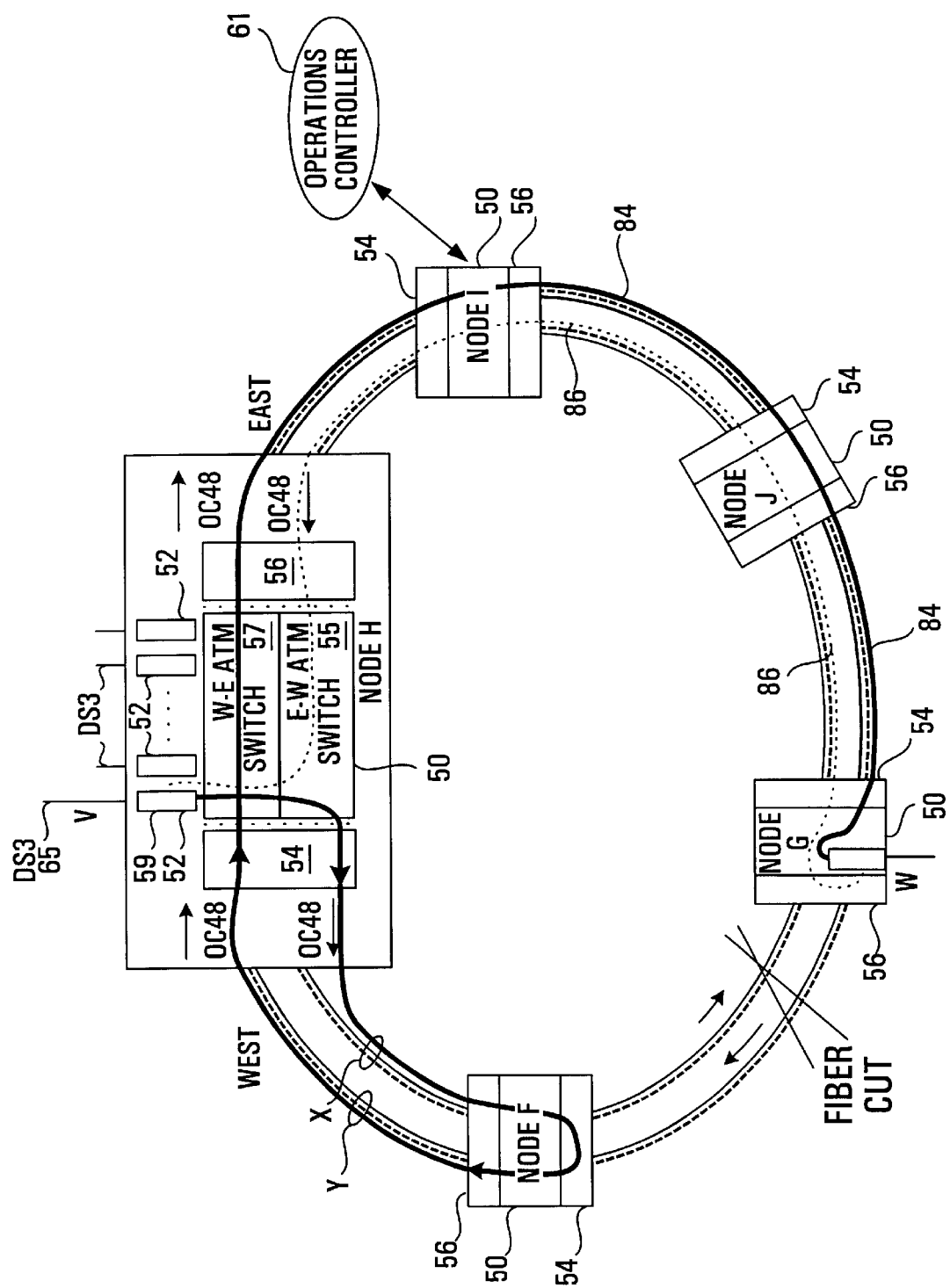
FIG. 6 is a re-routing scenario which may occur in the bi-directional line switched ring of FIG. 4.

The above scenario has focussed on the use of the working channels. This is the case when no fiber cuts or node failures have occurred. Referring now to FIG. 6, a scenario for the DS3 service discussed in which the fibers X,Y are cut between nodes F and G will be described. In this case, both nodes F and G will perform automatic protection switching which from a protection standpoint is similar to that used in the existing STM BLSR with the dedicated protection channels being used to carry the traffic but with differences which result in much superior capacity utilization. The path of cells taken between node H and node G is indicated with a solid line 84 with the portion on working channels shown adjacent the solid line of fiber X and the portion on protection channels shown adjacent the dashed line for fiber Y. Cells at node H destined for node G will first be sent on the working channels of fiber X to node F where FTU 54 will know the fiber cut between nodes F and G, and will loop the cells back to node H on the protection channels of fiber Y. The cells will then follow the protection channels through nodes I,J all the way to G. At node G, the cell will be terminated at an STU 63.

The return path of cells from node G to node H is indicated by dotted line 86 which is shown adjacent the dashed line for fiber X indicating protection channels. To begin, node G sends cells destined for node H to FTU 56 which is part of node G, and FTU 56 is aware of the fiber cut on fibers X and Y connecting nodes G and F and loops the cells back on the protection channels of fiber X. Node G forwards these cells on the protection channels of fiber X to nodes J,I and H, and node H detects the cells are addressed to it, and drops them at STU 59.

It can be seen that cells in the loop back protection channel may be terminated earlier in the path than they would be in conventional BLSRs. In particular, in the dedicated STS BLSR conventionally employed, cells are always looped all the way to the components on either side of the failed components before being looped back and terminated. An example of FIG. 6, conventional BLSR would route cells destined from node G to node H through nodes J,I,H, and then on to F where a loop back would be performed on a dedicated protection channel back to node H. The ATM-switch based BLSR provided by the invention allows cells to be terminated at node H without being looped to node F and back. This early path termination may ease any possible congestion downstream, especially in fiber failure situations.

Figure 7:
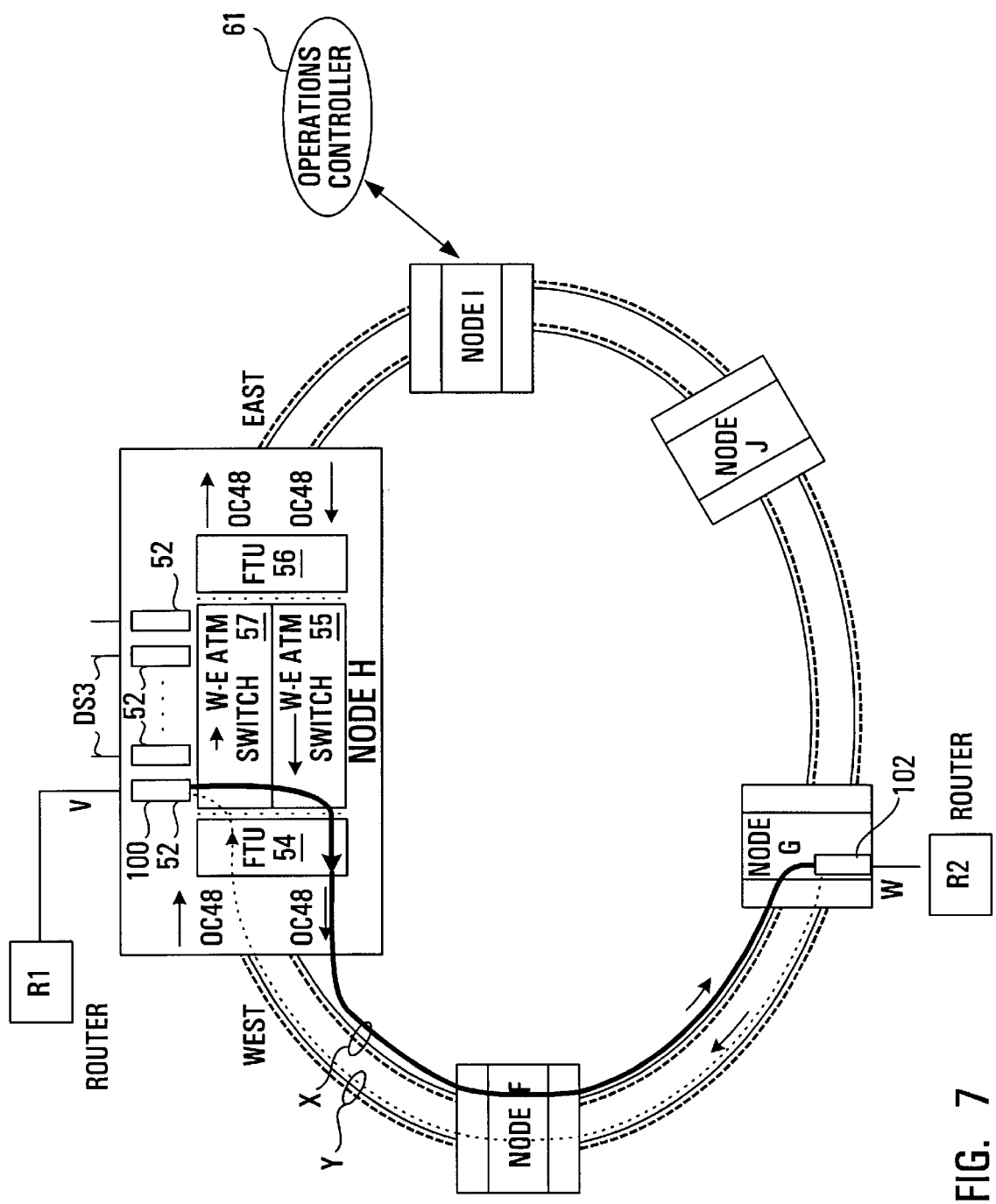
FIG. 7 is a schematic of a bi-directional line switched ring featuring ATM-based ADMs, configured as an IP switch.

In the above described example, all of the STUs were assumed to be DS3 cards. More generally, the STUs can be configured to convert information units received according to some service's protocol, and convert these to ATM cells, and vice versa. For example, in an alternative embodiment, these cards can be replaced with IP Forwarder cards. In this scenario, the ATM-based BLSR with IP Forwarder cards operates as an IP Router or IP switch. An example is provided in FIG. 7 in which a Router R1 is connected to an STU 100 which is an IP Forwarder card having assigned VCI-V in node H while a Router R2 is connected to an STU 102 which is an IP Forwarder card have assigned VCI-W in node B.

The ATM-based BLSR, now referred to as a ring router, operates as follows:

At system initialization, the operation controller 61 has knowledge of all the nodes under its control and each node has knowledge of its neighbours. When router R1 and router R2 are configured to be connected to the ring router, the IP address of router R1 is associated with VCI-V, and the IP address of R2 associated with VCI-W. This data is forwarded by the operations controller 61 to each node of the ring router, and it is used to create a routing table in each node consisting of a mapping between IP addresses and VCIs.

When router R1 sends an IP packet to router R2, the packet first terminates in STU 100. The destination IP address in the packet is read by STU 100. The destination VCI is then derived from the routing table; in this example the destination IP address is associated with VCI-W of STU 102. The packet is then chopped into ATM cells each of which has its VCI containing a value of W. The cells are then switched by the ATM switch in node H selecting the default short route to node G, for example. The principle has been previously discussed. At STU 102, the ATM cells are reassembled to form the original IP packet to be forwarded to router R2. An algorithm may be established such that the craftsperson may configure a recommended route for the connection. i.e. long or short; but this is a design issue. As the inner-nodal STSs are used to carry IP traffic, it is conceivable that the same STS can carry more than one subscriber. This scenario provides an example in which the BLSR with ATM-based ADMs has been used to perform Layer 3 routing.

The principle of switching can be extended to Layer 2 Switching. For example, Ethernets terminating at MAC addresses may be routed through such an ATM-based BLSR. The corresponding MAC addresses of the Ethernet terminations replace the IP addresses in the previous scenario. The Routing Table thus associates MAC addresses with STU VCIs. The switching of the cells follows the same process described previously.

Figure 8:
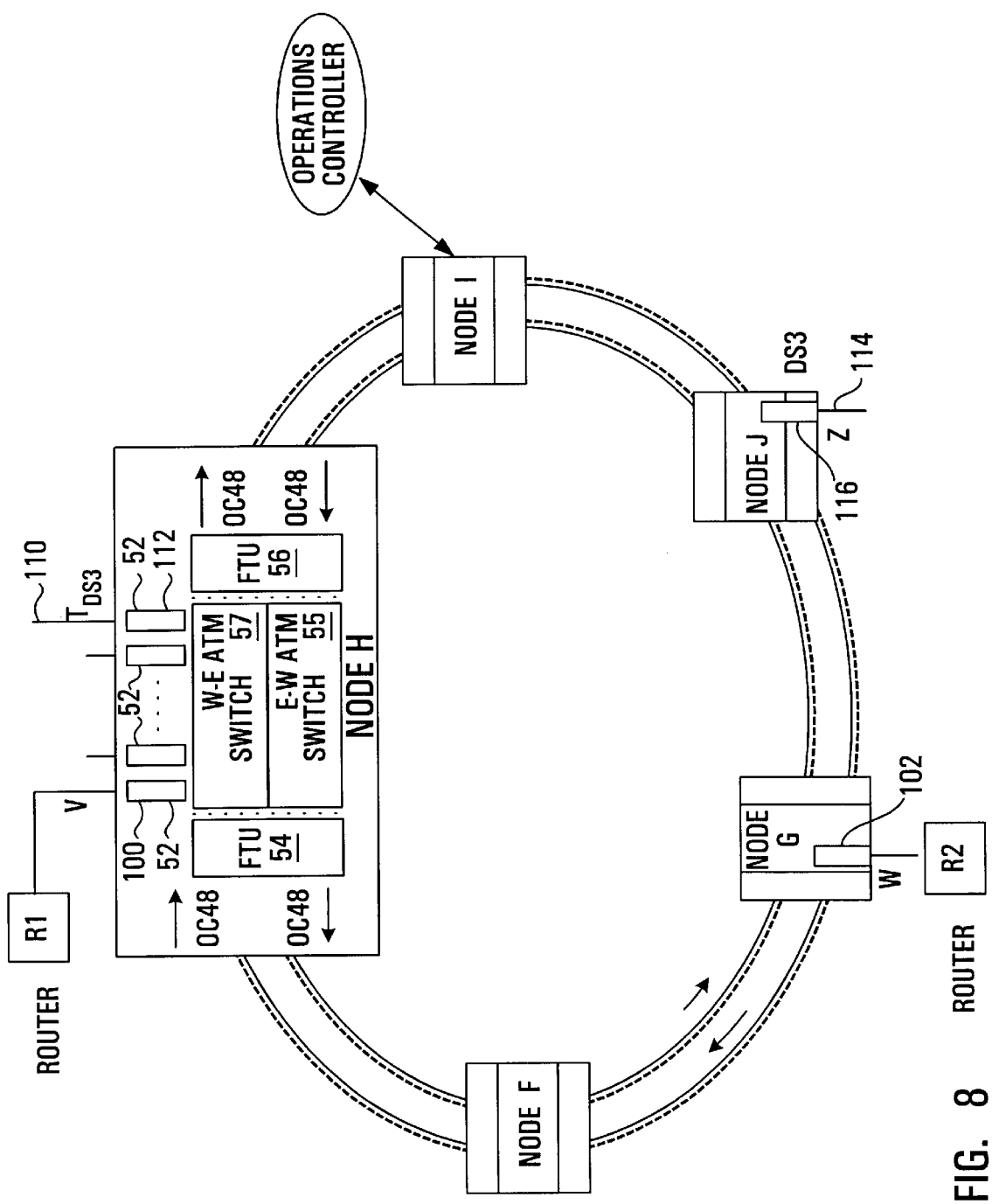
FIG. 8 is a bi-directional line switched ring employing ATM-based ADMs, configured as a multi-media switch.

Inter-working of IP on various transport technology (e.g. IP over ATM over SONET, IP over SONET etc) can be supported by the same apparatus. In an example illustrated in FIG. 8, a single ATM-based ADM may be equipped with a DS3 STU and an IP forwarder STU for communication with a DS3 STU and an IP Forwarder STU in one or more other nodes respectively. In this scenario, the ATM based BLSR is simultaneously supporting two distinct services:

DS3 service and IP service. As in the example of FIG. 7, node H has an IP router R1 connected to IP forwarder STU 100 with VCI V, and the other end is node G which has a router R2 connected to IP forwarder STU 102. At the same time, a DS3 line 110 is connected to a DS3 STU 112 having VCI T to node H. The other end of the DS3 connection is DS3 line 114 which is connected to DS3 STU 116 having VCI Z in node J. Thus the same BLSR is handling both IP and DS3 traffic. Of course this is just a particular example, and different or additional traffic types could also be handled providing that appropriate STUs are designed.

In a preferred embodiment, some of the 24 STS-1s may be provisioned for Variable Bit Rate traffic such that they can be shared by more subscribers. This will allow Carriers to charge different tariffs for various grades of services. The lower grades of services are also protected, albeit the service may degrade at system congestion, and the degradation may be manifested by slower response time in the application services. The existing STM BLSR can only offer "extra traffic" as a non-protected service.

In the examples described above, all of the working channels are available to any user, and each has a single corresponding protection channel. More generally, the working channels and corresponding protection channels can be partitioned, for example among different services. For example a first subset of the STSs may be used for DS3 originated traffic, a second subset may be used for IP originated traffic.

In the examples described above, the working channels and protection channels have corresponded with STS-1 optical tributaries. More generally, any type of optical tributary could be used, and more generally, any type of tributary, optical or otherwise may be used.

The inter-connection of multiple ATM switches forms a distributed switch. As such, the ATM based BLSR operates as a switch spread over hundreds of kilometers, as well as a transport network.

The illustrated and preferred embodiments feature an ATM switch in each node in the improved ADM which switches ATM cells. More generally, any switching component capable of switching its own switching units may be employed, provided conversion circuitry is provided for converting external traffic formats to/from switching units which are then switched to appropriate working channels or dropped from the ADM where appropriate. Furthermore, where FTUs have been provided for terminating the fibers and converting between electrical and optical signals, more generally some appropriate transport termination unit may be required to convert from electrical signals produced by the switching component to a format suitable for being carried by the medium of the ring.

Furthermore, in the illustrated example, the FTU has handled the loopback for protection. More generally, the switching component might be configured to perform this loopback. In this case, when a protection situation exists, cells received on working channels would be switched directly to the appropriate protection channels.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. An add/drop multiplexer comprising:
   a plurality of service terminating units (STUs) each having an associated identifier operable to receive information units from external services and converting these into switching units containing a destination identifier, and to receive switching units having the associated identifier and combine them into information units and output them to the external services;
   a switching component having a first set of dedicated receive ports operable to receive working channel traffic, a first set of dedicated transmit ports operable to transmit working channel traffic, a second set of dedicated receive ports operable to receive protection channel traffic, a second set of dedicated transmit ports operable to transmit channel traffic, and an STU port for each STU operable to receive switching units from the respective STU and to send switching units to the respective STU;
   wherein switching units received by the switching component from the STUs are output through the first set of dedicated transmit ports unless a protection event has occurred affecting those ports in which case the switching units are output through the second set of dedicated transmit ports; and
   wherein the destination identifier of each switching unit received by the switching component from the first set of dedicated receive ports is examined by the switching component, and if the destination identifier is the same as the identifiers associated with one of said STUs, the switching unit is passed to the one of said STUs, and otherwise the switching unit is output through the first set of dedicated transmit ports unless a protection event has occurred effecting those ports in which case the switching unit is output through the second set of dedicated transmit ports.

2. A multiplexer according to claim 1 wherein:
   said first set of dedicated receive ports comprises a respective first subset of receive ports through which cells can be received from a first neighbour node, and a respective second subset of receive ports through which cells can be received from a second neighbour node;
   said second set of dedicated receive ports comprises a respective first subset of receive ports through which cells can be received from the first neighbour node, and a respective second subset of receive ports through which cells can be received from the second neighbour node;
   said first set of dedicated transmit ports comprises a respective first subset of transmit ports through which cells can be transmitted to the first neighbour node, and a respective second subset of transmit ports through which cells can be transmitted to the second neighbour node;
   said second set of dedicated transmit ports comprises a respective first subset of transmit ports through which cells can be transmitted to a first neighbour node, and a respective second subset of transmit ports through which cells can be transmitted to a second neighbour node.

3. A multiplexer according to claim 2 for connection to an incoming East-West fiber, an outgoing East-West fiber, an incoming West-East fiber and an outgoing West-East fiber, the ADM further comprising:
   a first fiber termination unit receive circuit connected to receive optical signals from the incoming West-East fiber, operable to convert these to electrical signals and to pass them to the first subset of the first set of dedicated receive ports and the first subset of the second set of dedicated receive ports;

a second fiber termination unit receive circuit connected to receive optical signals from the incoming East-West fiber, operable to convert these to electrical signals and to pass them to the second subset of the first set of dedicated receive ports and the second subset of the second set of dedicated receive ports;

a first fiber termination unit transmit circuit connected to receive electrical signals from the second subset of the first set of dedicated transmit ports and the second subset of the second set of dedicated transmit ports, operable to convert these to optical signals and to transmit them on the outgoing West-East fiber;

a second fiber termination unit transmit circuit connected to receive electrical signals from the first subset of the first set of dedicated transmit ports and the first subset of the second set of dedicated transmit ports, operable to convert these to optical signals and to transmit them on the outgoing East-West fiber.

4. A multiplexer according to claim 3 wherein a first dedicated set of tributaries of said East-West fiber are connected to function as a first set of-working channels, a second dedicated set of tributaries of said East-West fiber are connected to function as a first set of protection channels, a first dedicated set of tributaries of said West-East fiber are connected to function as a second set of working channels, and a second dedicated set of tributaries of said West-East fiber are connected to function as a second set of protection channels.

5. A multiplexer according to claim 3 wherein a particular port for each switching unit is selected to be a next available port.

6. A bi-directional line switched ring comprising a plurality of ADMs according to claim 1 connected together by two fiber rings.

7. An ADM according to claim 1 wherein said STUs include at least one STU operable to handle a DS3 external service, each such STU comprising circuitry operable to convert DS3 packets into switching units having the STU's identifier and to output these to the switching component, and circuitry operable to convert switching units received from the switching component having the STU's identifier into DS3 packets and to output these to the external service.

8. An ADM according to claim 1 wherein said STUs include at least one STU operable to handle an IP external service, each such STU comprising circuitry operable to convert IP packets into switching units cells having the STU's identifier and to output these to the switching component, and circuitry operable to convert switching units received from the switching component having the STU's identifier into IP packets and to output these to the external service.

9. An ADM according to claim 1 wherein said STUs include at least one STU operable to handle an Ethernet external service, each such STU comprising circuitry operable to convert Ethernet packets into switching units having the STU's identifier and to output these to the switching component, and circuitry operable to convert switching units received from the switching component having the STU's identifier into Ethernet packets and to output these to the external service.

10. An ADM according to claim 1 wherein the switching component is an ATM (asynchronous transfer mode) switch, the switching units are ATM cells, and the STU identifiers are ATM identifiers.

11. An ADM according to claim 1 wherein the switching component decides whether to send a switching unit on working channel ports or protection channel ports.

12. An ADM according to claim 7 wherein the fiber termination units decide whether to send a switching unit on working channels or on protection channels.

13. A multiplexing method in a multiplexer comprising:
providing a plurality of I/O ports to external services each having an address;
providing at least one set of groups of tributaries, the set of groups of tributaries comprising:
    a) a first group of input working channel tributaries on a first physical link, a first group of output working channel tributaries on a second physical link;
    b) a first group of input protection channel tributaries on the second physical link and a first group of output protection channel tributaries on the first physical link;
    c) a second group of input working channel tributaries on a third physical link, a second group of output working channel tributaries on a fourth physical link;
    d) a second group of input protection channel tributaries on the fourth physical link and a second group of output protection channel tributaries on the third physical link;
the second group of output protection channel tributaries being associated with the first group of input working channel tributaries, and the first group of output protection channel tributaries being associated with the second group of input working channel tributaries;
configuring for each of said I/O ports a respective one of said groups of output working channel ports;
for each set of groups:
    a) for traffic received on the first group of input working channel tributaries, dropping traffic addressed to one of said I/O ports, outputting traffic not addressed to any of said I/O ports on the first group of output working channel tributaries unless the second physical link is down in which case outputting the traffic on the second group of output protection channel tributaries;
    b) for traffic received on the second group of input working channel tributaries, dropping traffic addressed to one of said I/O ports, outputting traffic not addressed to any of said I/O ports on the second group of output working channel tributaries unless the fourth physical link is down in which case outputting the traffic on the first group of output protection channel tributaries;
    c) for traffic received on the first group of input protection channel tributaries, dropping traffic addressed to one of said I/O ports, outputting traffic not addressed to any of said I/O ports on the first group of output protection channel tributaries unless the second physical link is down in which case terminating the traffic;
    d) for traffic received on the second group of protection working channel tributaries, dropping traffic addressed to one of said I/O ports, outputting traffic not addressed to any of said I/O ports on the second group of output protection channel tributaries unless the fourth physical link is down in which case terminating the traffic;
for each traffic unit received from the I/O ports, outputting it on a respective configured one of said groups of output working channel tributaries unless the physical link for the configured group is down in which case outputting the traffic on the group of protection channel tributaries associated with the configured group.

14. A method according to claim 13 wherein there is a single one of said sets of groups.

15. A method according to claim 13 wherein there are at least two of said sets of groups defined on the same four physical links, each group being configured to handle traffic for a certain group of said I/O ports.

16. A method according to claim 13 further comprising converting traffic formats of the external services to a first common traffic format handled by the physical links.

17. A method according to claim 16 wherein converting traffic formats of the external services to a common format handled by the physical links comprises converting traffic formats of the external services to a second common format appropriate for use internal to the multiplexer in determining which group of output tributaries to use, and after determining which group of output tributaries to use, converting the second common traffic format to the first common traffic format.

18. An asynchronous transfer mode (ATM) based add/drop multiplexer (ADM) comprising:

a plurality of service terminating units (STUs) each having an associated ATM identifier operable to receive information units from external services and to convert these into ATM cells containing said associated ATM identifier, and to receive ATM cells having the associated ATM identifier and combine them into information units and output them to the external services;

an ATM switch having a first set of dedicated receive ports operable to receive working channel traffic, a first set of dedicated transmit ports operable to transmit working channel traffic, a second set of dedicated receive ports operable to receive protection channel traffic, a second set of dedicated transmit ports operable to transmit channel traffic, and an STU port for each STU operable to receive cells from the STU and to send cells to the STU;

wherein cells received by the ATM switch from the STUs are output through the first set of dedicated transmit ports unless a protection event has occurred effecting the first set of dedicated transmit ports in which case the cells are output through the second set of dedicated transmit ports; and wherein the ATM identifier of each cell received by the ATM switch from the first set of dedicated receive ports is examined by the ATM switch, and if the ATM identifier is associated with one of said STUs, the cell is passed to the one of said STUs, and otherwise the cell is output through the first set of dedicated transmit ports unless a protection event has occurred effecting the first set of dedicated transmit ports in which case the cells are output through the second set of dedicated transmit ports.

19. An ADM according to claim 18 wherein:

said first set of dedicated receive ports comprises a respective first subset of receive ports through which cells can be received from a first neighbour node, and a respective second subset of receive ports through which cells can be received from a second neighbour node;

said second set of dedicated receive ports comprises a respective first subset of receive ports through which cells can be received from the first neighbour node, and a respective second subset of receive ports through which cells can be received from the second neighbour node;

said first set of dedicated transmit ports comprises a respective first subset of transmit ports through which cells can be transmitted to the first neighbour node, and a respective second subset of transmit ports through which cells can be transmitted to the second neighbour node;

said second set of dedicated transmit ports comprises a respective first subset of transmit ports through which cells can be transmitted to a first neighbour node, and a respective second subset of transmit ports through which cells can be transmitted to a second neighbour node.

20. An ADM according to claim 19 for connection to an East-West fiber and a West-East fiber, the ADM further comprising:

a first fiber termination unit receive circuit connected to receive optical signals from the West-East fiber, operable to convert these to electrical signals and to pass them to the first subset of the first set of dedicated receive ports and the first subset of the second set of dedicated receive ports;

a second fiber termination unit receive circuit connected to receive optical signals from the East-West fiber, operable to convert these to electrical signals and to pass them to the second subset of the first set of dedicated receive ports and the second subset of the second set of dedicated receive ports;

a first fiber termination unit transmit circuit connected to receive electrical signals from the second subset of the first set of dedicated transmit ports and the second subset of the second set of dedicated transmit ports, operable to convert these to optical signals and to transmit them on the West-East fiber;

a second fiber termination unit transmit circuit connected to receive electrical signals from the first subset of the first set of dedicated transmit ports and the first subset of the second set of dedicated transmit ports, operable to convert these to optical signals and to transmit them on the East-West fiber.

21. An ADM according to claim 18 wherein said STUs include at least one STU operable to handle a DS3 external service, each such STU comprising circuitry operable to convert DS3 packets into ATM cells having the STU's ATM identifier outputting these to the ATM switch, and circuitry operable to convert ATM cells received from the ATM switch having the STU's ATM identifier into DS3 packets and to output these to the external service.

22. An ADM according to claim 18 wherein said STUs include at least one STU operable to handle an IP external service, each such STU comprising circuitry operable to convert IP packets into ATM cells having the STU's ATM identifier and to output these to the ATM switch, and circuitry operable to convert ATM cells received from the ATM switch having the STU's ATM identifier into IP packets and to output these to the external service.

23. An ADM according to claim 18 wherein said STUs include at least one STU operable to handling an Ethernet external service, each such STU comprising circuitry operable to convert Ethernet packets into ATM cells having the STU's ATM identifier and to output these to the ATM switch, and circuitry operable to convert ATM cells received from the ATM switch having the STU's ATM identifier into Ethernet packets and to output these to the external service.

* * * * *